INVENTORS
HIROTOSHI SHIRASU
TADAHIKO AKIYAMA
YASUMICHI ARAI

BY Paul M. Craig, Jr.
ATTORNEY

INVENTORS
HIROTOSHI SHIRASU
TADAHIKO AKIYAMA
YASUMICHI ARAI

BY Paul M. Craig, Jr.
ATTORNEY

INVENTORS
HIROTOSHI SHIRASU
TADAHIKO AKIYAMA
YASUMICHI ARAI

BY Paul M. Craig, Jr.
ATTORNEY

INVENTORS
HIROTOSHI SHIRASU
TADAHIKO AKIYAMA
YASUMICHI ARAI

BY Paul M. Craig, Jr.
ATTORNEY

United States Patent Office 3,382,323

Patented May 7, 1968

3,382,323

MULTISTAGE SWITCHING FRAMES HAVING LINK CONGESTION REDUCING MEANS

Hirotoshi Shirasu, Tadahiko Akiyama, and Yasumichi Arai, Yokohama, Japan, assignors to Hitachi, Ltd., Tokyo, Japan Filed May 7, 1965, Ser. No. 453,991
Claims priority, application Japan, May 8, 1964, 39/25,807
5 Claims. (Cl. 179—22)

This invention relates to an automatic switching system of the type employed with multistage switching frames consisting of crossbar switches.

In a common control type of automatic switching system, especially in a switching system of the so-called crossbar type, channel switches are almost invariably accommodated in a manner to form multistage switching frames. Of these multistage switching frames, a switching frame having crossbar switches arranged, for example, in three stages is suitable for a line capacity of the order of several hundred lines. However in the frame structure heretofore employed, subscriber lines (more generally, incoming lines including the lines from other switching systems) belonging to one of such switching frames are merely connected with outgoing lines or trunks through primary switches, secondary switches and tertiary swtches of the switching frame, and therefore the link congestion becomes inevitably greater as the traffic applied to one switching frame is increased, resulting in deficiency of satisfactory service. In order to remedy such difficulty in the prior arrangement, the number of links connecting between the stages must be increased, which is however undersirable in respect of economy. A further defect involved in the prior frame structure is that an increase in the number of lines inevitably results in an abrupt increase in the number of the tertiary switches, which increase is also undesirable in respect of compact switching frame structure.

It is therefore the primary object of the present invention to provide a novel automatic switching system of the multistage switching type in which primary links and secondary links of more than two switching frames of the three-stage switching type, for example, are interconnected with one another by additional links so as to economically reduce the link congestion and to increase the number of available circuits up to several thousands.

The foregoing and other objects, advantages and features of the present invention will become apparent from the following detailed description with reference to the accompanying drawings, in which.

Figures 1, 3:
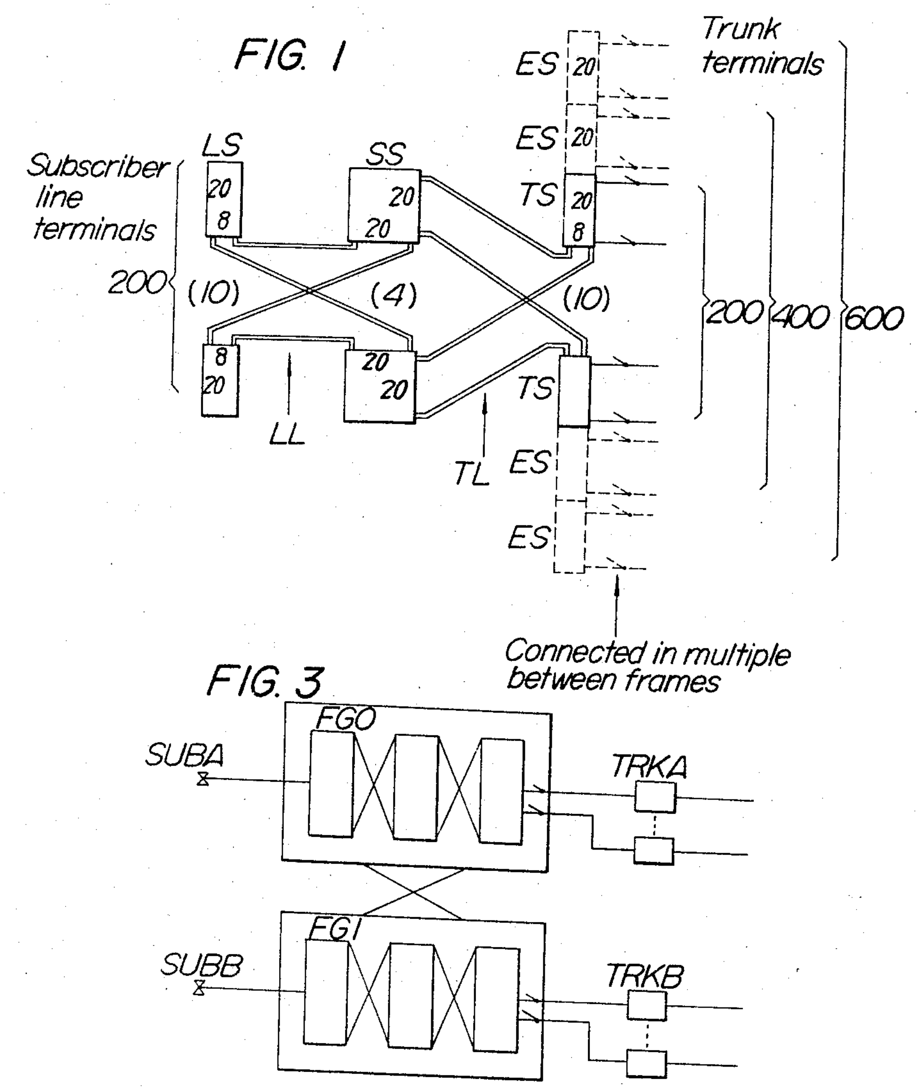
FIG. 1 is a schematic diagram showing a link arrangement in a three-stage switching frame of conventional type.
FIG. 3 is a block diagram showing the trunking scheme in the automatic switching system having a link arrangement shown in FIG. 2.

At first referring to FIG. 1, a typical example of the structure of a well-known three-stage switching frame will be described. Each switching frame has a capacity of 200 terminals connected to subscriber lines and 200 terminals connected to trunks. When the number of subscribers exceeds 200, multiple connection between the outlets of the tertiary switches of a plurality of switching frame may be made as shown in FIG. 1 and the number of subscriber line terminals may be increased to deal with this situation. When however the number of trunks exceeds 200, a plurality of additional switches ES may be connected in multiple to the verticals of the tertiary switches TS in each switching frame as shown by broken lines in order to accommodate the trunks in excess of 200 because any one trunk must generally be connected with any one subscriber. In this method, however, the number of tertiary switches in each switching frame must be doubled in order to double the number of the trunk terminals and must be tripled in order to triple the number of the trunk terminals with the result that the number of the switches will abruptly increase as the number of subscriber lines increases.

In the frame structure of FIG. 1, suppose that crossbar switches having ten horizontals, twenty verticals and six make contacts at each crosspoint are suitably changed over as by relays so as to be used as crossbar switches of three wire type having twenty horizontals and twenty verticals to form the switching frame. Then the number of the switches required will be more than 0.06 for each subscriber at the number of trunk terminals of less than 200, more than 0.08 at the number of trunk terminals of from 201 to 400, and more than 0.10 at the number of trunk terminals of from 401 to 600. As pointed out in the above, such increase in the number of the tertiary switches is undesirable from a view point of compact frame structure.

The invention eliminates the prior drawback in this type of automatic switching system and will be described in detail with regard to its preferred embodiments. An embodiment of the present invention is shown in FIG. 2 in which the invention is applied to a switching system comprising ten three-stage switching frames each having 200 subscriber line terminals as shown in FIG. 1 so that each switching frame can accommodate therein trunks which number from more than 201 to 400 at the maximum.

Figure 2:
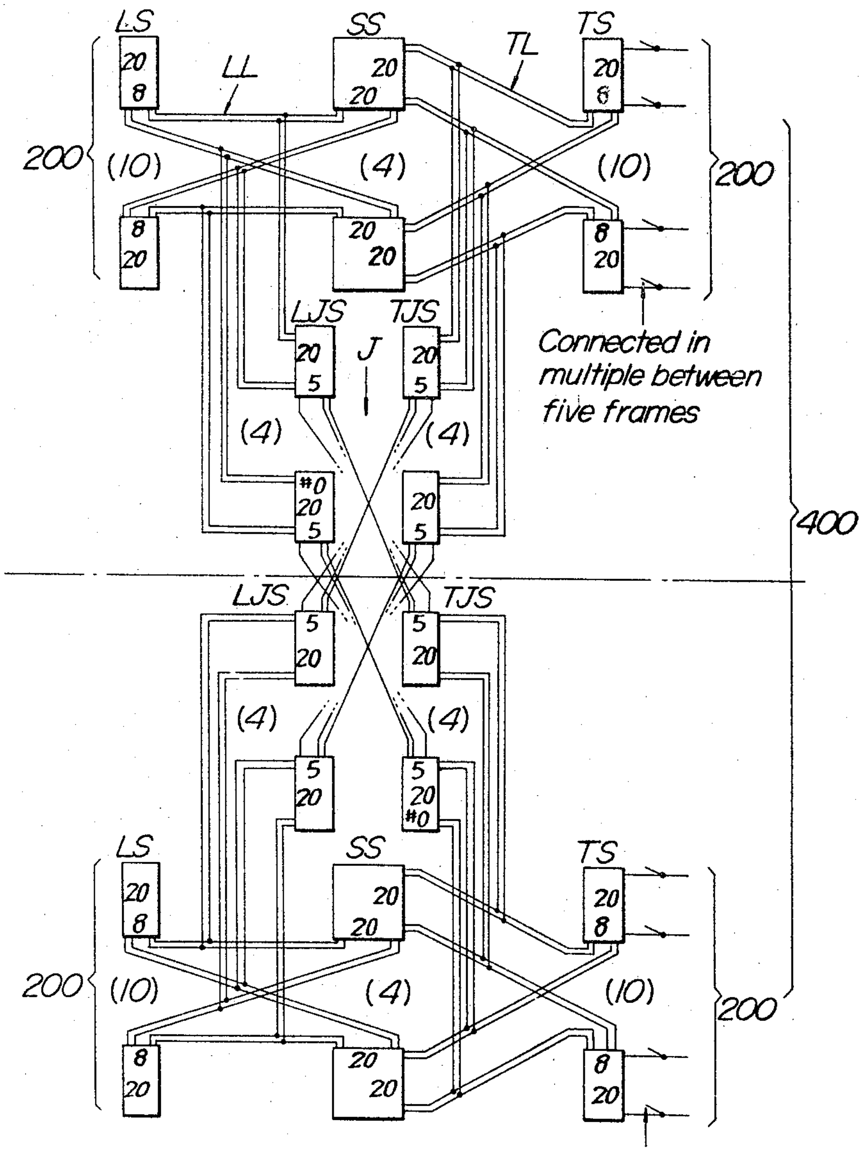
FIG. 2 is a schematic diagram showing a link arrangement in the frame structure according to the present invention.

In the link arrangement shown in FIG. 2, ten switching frames each having primary switches LS, secondary switches SS and tertiary switches TS arranged in three stages are divided into two frame groups FG0 and FG1 each consisting of five switching frames and outlets or trunk terminals of the tertiary switches TS of the five frames in each frame group are connected in multiple between the five frames. Further in order to make possible the connection between the entire subscribers and the entire trunks, verticals of two crossbar switch units each having twenty verticals and twenty horizontals are divided into four so that these are used as four primary junctor switches LJS and four secondary junctor switches JTS for thereby effecting desired connection. Or more precisely, two primary links LL from each primary switch LS are connected to two horizontals of each primary junctor switch LJS, and likewise two secondary links TL to each tertiary switch TS are connected to two horizontals of each secondary junctor switch TJS, then verticals of the primary junctor switches LJS on a frame belonging to one of the frame groups is connected by means of junctors J with verticals of the secondary junctor switches TJS on a frame belonging to the other frame group in a manner as described below. Taking for example a case of the primary junctor switch LJS #0 appearing on the frame belonging to the frame group FG0 shown in FIG. 2, five verticals of this primary junctor switch LJS #0 are connected to verticals of each of the secondary junctor switches TJS #0 on the five frames belonging to the frame group FG1 in a manner that there is one junctor J terminating in one vertical of each secondary junctor switch TJS #0. The term "junctor" used herein is intended to designate a link connecting between the primary junctor switch and the secondary junctor switch. It will be understood that in this manner of connection it is possible to increase the number of trunk terminals up to 400, and the subscribers and the trunks belonging to the same frame group can be interconnected with one another through the three-stage switching connection while the subscribers and the trunks belonging to the different frame groups can be interconnected with one another through the four-stage switching connection. Thus, the entire subscribers can be interconnected with the entire trunks.

The above-described embodiment merely illustrates a case in which four primary junctor switches having twenty horizontals and five verticals and four secondary junctor switches also having twenty horizontals and five verticals are additionally installed on each frame. In this particular case, it will be seen that the number of crossbar switches required is only 0.07 for each subscriber, which value is less than that in the case of FIG. 1.

A preferred control method for such link arrangement will next be described. Link congestion in the arrangement as shown in FIG. 2 will be derived from the following equations. Suppose now that the efficiency of the primary links LL is $a$, the efficiency of the secondary links TL is $b$, and the efficiency of the junctors J is $c$. Then, congestion $E_3$ for the three-stage switching connection can be expressed as $$E_3=\{a^2+(1-a^2)b^2\}^4$$

while congestion $E_4$ in the case of the four-stage switching connection can be expressed as $$E_4=[a^2+(1-a^2)\{c+(1-c)b^2\}^5]^4$$

It is to be understood that the above equation related to the case of the four-stage switching connection represents a loss which results from the link arrangement in which each frame group consists of five frames and the five junctors of one junctor switch on one frame of the one of the frame groups are connected to the corresponding junctor switches on the five frames of the other frame group.

As will be apparent from the link arrangement as described above, the total number of the primary links LL equals to the total number of the secondary links TL, therefore it is obvious that $a=b$. From this condition and assuming that $E_3=E_4=1/00$, the efficiencies of the links and the junctors are given as follows:

$a=b=0.417$
$c=0.642$

Therefore the total traffic for the links on one frame can be obtained by multiplying the above value by the number of the links. Thus, the total traffic for the primary links LL is $$0.417\times 80=33.4 \text{ erlangs}$$

while the total traffic for the junctors J is $$0.642\times 20=12.8 \text{ erlangs}$$

From the above calculation it will be known that the total traffic for each frame is 33.4 erlangs, of which 12.8 erlangs can be carried by the portion of the four-stage switching connection.

Consider now about the ratio of the traffic carried by the portion of the three-stage switching connection to the traffic carried by the portion of the four-stage switching connection. The traffic carried by the former will equal to the traffic carried by the latter in case of the two frame groups provided that the trunks for each frame group are so arranged that traffic density is equal for both. In other words, since the total traffic for each frame is 33.4 erlangs as will be apparent from the above calculation, the traffic to be carried by the portion of the three-stage switching connection is assumed to be the half of 33.4 erlangs or 16.7 erlangs while the traffic to be carried by the portion of the four-stage switching connection is likewise 16.7 erlangs. Therefore the traffic of 12.8 erlangs which can be carried by the portion of the four-stage switching connection as derived from the above calculation is insufficient compared with the actual traffic load applied thereto. This deficiency in the traffic carrying capacity may easily be solved by enlarging the primary and secondary junctor switches so as to increase the number of junctors. However, according to the present invention, such difficulty can be solved by the following two methods without resorting to such means.

According to the first method of the invention, advantage is taken of the fact that the portion of the three-stage switching connection has a traffic carrying capacity of 33.4 erlangs as shown in the result of the above calculation and a condition is provided in the manner of connection control so as to increase the traffice to be carried by the portion of the three-stage switching connection and to reduce the traffic to be carried by the portion of the four-stage switching connection. In case of a terminating call, there is utterly no means for effective control since a trunk in which the call is terminated and a subscriber to whom connection is required are determined independently of the control by the switching system. In case of an originating call, however, a calling subscriber and a plurality of trunks to which connection is required are generally determined and selection of one trunk out of the plurality of trunks is under the control of the switching system. It is therefore possible in the case of the originating call to preferentially select and seize during selecting operation a trunk to which the three-stage switching connection can be made. The first method as described above will be more clearly understood from FIG. 3 which shows a simplified diagram of the frame structure of FIG. 2. In FIG. 3 it will be seen that one of the trunks TRKA is preferentially selected when a subscriber SUBA originates a call and one of the trunks TRKB is selected and connected with the subcriber SUBA through the four-stage switching connection only when the trunks TRKA are all busy. Likewise the trunk TRKB is preferentially selected when a subscriber SUBB originates a call. It is needless to say that both of the above trunks TRKA and TRKB belong to the same route. In this manner of control, the portion of the three-stage switching connection can carry the greater portion of 16.7 erlangs which is the traffic density of originating calls per frame and the half of 16.7 erlangs which is the traffic density of terminating calls per frame, while the portion of the four-stage switching connection can carry that portion of the originating calls which cannot be handled by the three-stage switching connection and the half of 16.7 erlangs which is the traffic density of terminating calls per frame. It will be thus known that the portion of the four-stage switching connection having the traffic carrying capacity of 12.8 erlangs as derived from the above calculation is quite capable of handling the traffic load applied thereto.

Figure 4:
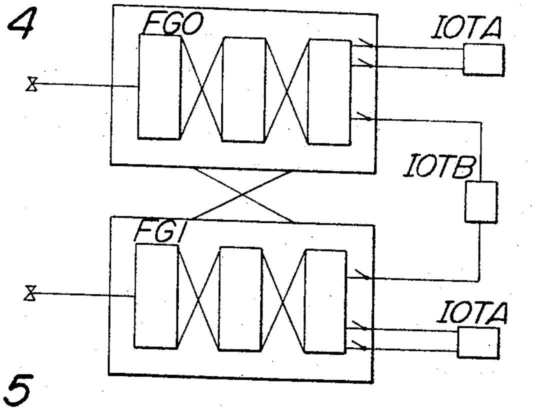
FIG. 4 is a block diagram showing another trunking scheme according to the present invention.

The second method according to the present invention is as schematically illustrated in a trunking diagram of FIG. 4. According to this method, an intraoffice trunk IOTB is provided in a manner to be connected to both of the frame groups FG0 and FG1 so as to handle, through the three-stage switching connection, intraoffice calls which are considered to occupy about the half of the total traffic. In FIG. 4, arrangement is such that connection between subscriber lines belonging to the frame group FG0 and connection between subscriber lines belonging to the frame group FG1 are effected by respective intraoffice trunks IOTA associated with the respective frame groups, while connection between the subscriber lines belonging to the frame group FG0 and the subscriber lines belonging to the frame group FG1 is effected by the intraoffice trunk IOTB, so that the entire connections can be made through the three-stage switching operation. In order however to completley effect the entire connections through the three-stage switching operation, intraoffice trunks must be divided into a multiplicity of groups and an increase in the number of the intraoffice trunks may result. This difficulty can be eliminated by arranging in a manner that connection may be made through four-stage switching connection when the trunks through which three-stage switching connection can be effected are all busy. Since, in this manner of control, complete group selection of all of the intraoffice trunks can be made, it is unnecessary to increase the number of the intraoffice trunks and it is also possible to effect remarkable reduction in the traffic to be handled through the four-stage switching connection. The traffic to be handled through the four-stage switching connection can further be reduced by suitably combining the above-described first and second methods.

Though the above description has referred to the case of two frame groups and three stages, the inventive method is also applicable to an increased number of frame groups or stages. In a case of more than three stages, the first stage links and the last stage links shall be corresponding to the above primary links and secondary links, respectively. Furthermore for example, the number of the frame groups in FIG. 2 can be increased to five or six frame groups by merely doubling the number of the junctors per frame, that is, by providing forty junctors. Now the invention will be compared with the prior method as shown in FIG. 1, assuming that the number of switches is equal for both. Then, the number of trunk terminals according to the method of FIG. 1 is 400, whereas according to the method of the present invention as explained with reference to FIG. 2, a remarkable advantage can be derived since it is possible to obtain such great number of trunk terminals which amount to 1,000 to 1,200 without in the least degrading the switching function. A further advantage derivable from the frame structure shown in FIG. 2 is that multiple connection of trunk terminals between the frame groups can provide additional connecting paths between the subscriber line terminals and the trunk terminals besides the normal paths through the three-stage switching connection. These additional paths are through the junctors and the secondary links of other frames. Thus, link congestion can greatly be decreased. Link congestion can likewise be decreased by providing a manner of link connection in one frame as shown in FIG. 5.

Figure 5:
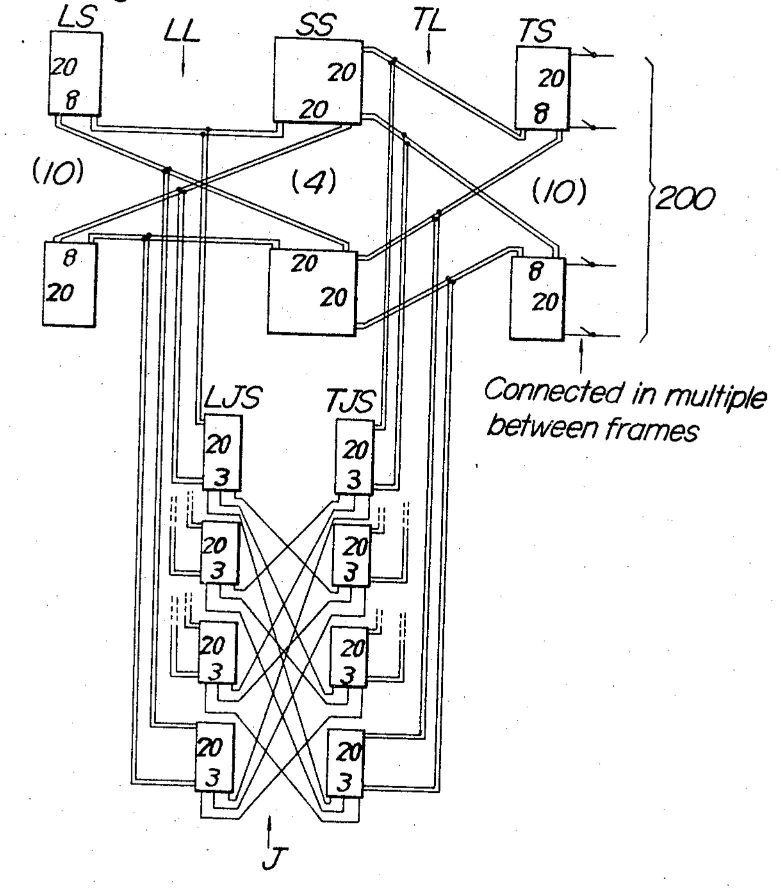
FIG. 5 is a schematic diagram showing another link arrangement in the frame structure according to the present invention.

In FIG. 5, each primary link LL in a frame is connected by the junctors J with the secondary links TL in the same frame having no connecting paths with said primary link.

Figure 6:
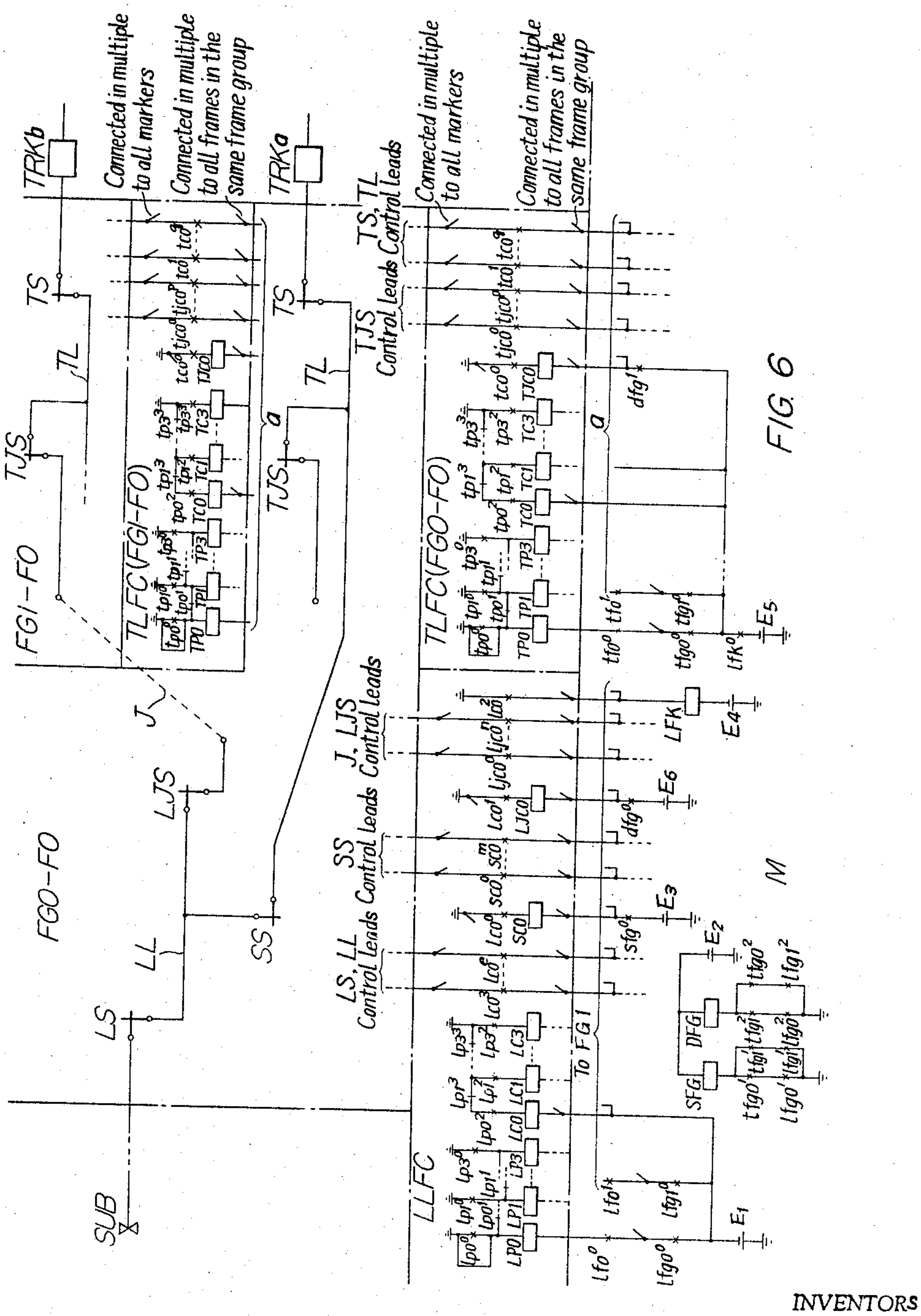
FIG. 6 is a circuit diagram of control means employed in connection with the frame structure of FIG. 2.

For the sake of reference and by way of example, a system for controlling three-stage switching frames having the structure as shown in FIG. 2 will be described with reference to FIG. 6. In FIG. 6, there is shown a method of connector control for frames of the structure as shown in FIG. 2 in which a subscriber and a trunk in the same frame group are connected through three-stage switching connection and a subscriber and a trunk belonging to different frame groups are connected through four-stage switching connection. In FIG. 6, a subscriber SUB belonging to the No. 0 frame FG0–F0 of a frame group FG0 is connected to a trunk TRK*a* by three-stage switching connection through a primary switch LS, primary link LL, secondary switch SS, secondary link TL and tertiary switch TS, while the subscriber SUB is connected to a trunk TRK*b* through the primary switch LS, primary link LL, primary junctor switch LJS, and junctor J of the frame FG0–F0 and through a secondary junctor switch TJS, secondary link TL and tertiary switch TS of the No. 0 frame FG1–F0 of a frame group FG1. Therefore, for the control of such three-stage switching frames, the two different frames must be seized with the junctor J used as a connector therebetween in the case of the four-stage switching connection. By this reason, in the case of the three-stage switching connection too, the connecting operation is placed under separate control by line link frame connectors LLFC for the primary links and by trunk link frame connectors TLFC for the secondary links.

The manner of control in the case of the three-stage switching connection will first be described. After a marker M completes the identification of a calling subscriber line and selection of a trunk, respective relays LFG0 and LF0 (not shown) corresponding to the frame group and the frame to which the subscriber SUB belongs are operated in the marker M, while respective relays TFG0 and TF0 (not shown) corresponding to the frame group and the frame having access to the selected trunk TRK*a* are operated. This operation determines the frame on the subscriber side and the frame on the trunk side, and a circuit is completed which extends from battery E1 in the marker M, make contact $lfg0^0$, the contact of the above-mentioned relay LFG0, make contact $lf0^0$ of relay LF0, relay LP0 in the line link frame connector LLFC to ground to operate the relay LP0 and to start the operation of the connector. Upon operation of the relay LP0, its break contact $lp0^1$ cuts off from ground other start relays LP1 to LP3 corresponding to other markers to lock out this frame FG0–F0 from other markers. At the same time a circuit is completed which extends from battery E1 in the marker M, relay LC0 in the line link frame connector LLFC, make contact $lp0^2$, break contacts $lp1^3$ . . . $lp3^3$ to ground to operate the connector relay LC0. Contacts $lc0^3$ to $lc0^1$ of relay LC0 connect to the marker M the leads for the control of the primary switches LS and primary links LL in the frame. In the meantime, operation of the relays LFG0 and TFG0 causes the operation of relay SFG in the marker M, this relay SFG showing that the subscriber and the trunk belong to the same frame group FG0. The operation of relay SFG is caused by a circuit which is traced from battery E2, relay SFG, make contact $tfg0^1$, make contact $lfg0^1$ to ground. Then a connector relay SC0 corresponding to the secondary switches SS is operated in the line link frame connector LLFC by a circuit which is traced from battery E3 in the marker M, make contact $sfg^0$, connector relay SC0, contact $lc0^0$ to ground. By the operation of the relay SC0, its make contacts $sc0^0$–$sc0^m$ connect to the marker M the leads for the control of the secondary switches SS in the connecting paths of three-stage switching connection.

When the connector relay LC0 is operated in the line link frame connector LLFC, a connector check relay LFK is operated in the marker M by a circuit which is traced from battery E4, relay LFK, make contact $lc0^2$ to ground so that a trunk link frame connector TLFC associated with the frame FG0–F0 is immediately operated. That is, a relay TP0 in the trunk link frame connector TLFC associated with the frame FG0–F0 is operated by a circuit which is traced from battery E5 in the marker M, make contacts $lfk^0$, $tfg0^0$ and $tf0^0$, relay TPO to ground and thus the connector is placed in operation. Subsequent operation is similar to the case of the line link frame connector LLFC. That is, a connector relay TC0 is operated so that its make contacts $tc0^1$–$to0^q$ connect to the marker M the leads for the control of the tertiary switches TS and secondary links TL. By the above operation, all of the circuits necessary for the control of the three-stage switching connection are connected with the marker M, while the relay SFG has been operated in the marker M to identify that the connection is to be made by the three-stage switching connection in the same frame group. Thereafter, connection is completed by means similar to that heretofore employed in the art of three-stage switching connection.

The manner of control in the case of the four-stage switching connection will next be described. As in the case of the three-stage switching connection, the respective relays LFG0 and LF0 corresponding to the frame group and the frame to which the subscriber SUB belongs are operated in the marker M, while respective relays TFG1 and TF0 (not shown) corresponding to the frame group and the frame having access to the selected trunk TRK$b$ are operated. The marker M identifies that the frame group on which the subscriber line appears differs from the frame group on which the selected trunk appears and a relay DFG is operated by a circuit which is traced from battery E2, relay DFG, make contacts $tfg1^2$ and $lfg0^2$ to ground. At the same time, the line link frame connector LLFC is operated as in the case of the three-stage switching connection to operate the relays LP0 and LC0. Upon operation of the relay LC0, its contacts $lc0^3$–$lc0^1$ connect to the marker M the leads for the control of the primary switches LS and primary links LL of this particular frame. Since further the relay DFG has been operated in the marker M, a connector relay LJC0 in the line link frame connector LFC is operated by a circuit which is traced from battery E6, make contact $dfg^0$, relay LJC0, make contact $lc0^1$ to ground. Upon operation of the relay LJC0, its contacts $ljc0^0$–$ljc0^n$ connect to the marker M the leads for the control of the junctors J and primary junctor switches LJS.

After confirming the operation of the relay LC0 in the line link frame connector LLFC, its contact $lc0^2$ is connected to ground to operate a relay LFK in the marker M so that the trunk link frame connector TLFC associated with the frame FG1–F0 is placed in operation. That is, a relay TP0 in the trunk link frame connector TLFC (FG1–F0) is operated by a circuit which is traced from battery E5, contact $lfk^0$, contact $tfg1^0$, contact $tf0^1$ (via the jumping mark @, relay TP0 to ground. Then, a relay TC0 in the trunk link frame connector TLFC (FG1–F0) is operated by a circuit which is traced from battery E5 (via the jumping mark @) relay TC0, make contact $tp0^2$, break contacts $tp1^3 \sim tp3^3$ to ground. Upon operation of the relay TC0, its contacts $tc0^1 \sim tc0^q$ connect to the marker M the leads for the control of secondary links TL and tertiary switches TS on the frame FG1–F0 which is the No. 0 frame of the frame group FG1.

Further, the operation of make contact $tc0^0$ causes the operation of a connector relay TJC0 in the trunk link frame connector TLFC (FG1–F0) by a circuit which is traced from battery E5, contact $lfk^0$, contact $dfg^1$ (via the jumping mark @), relay TJC0, contact $tc0^0$ to ground. By the operation of the relay TJC0, the leads for the control of the secondary junctor switches TJS on the frame FG1–F0 are connected to the marker M. The above operation completes the connection of the marker M with all of the parts of the frames related with the four-stage switching connection, and thereafter the four-stage switching connection can be completed in the manner heretofore known in the art.

From the above description it will be understood that the three-stage and four-stage switching connections can be satisfactorily effected in the frame structure embodying this invention by the manner of frame connector control as shown in FIG. 6.

What is claimed is:

1. An automatic switching system including a plurality of multistage switching frames each having a plurality of links arranged in more than two stages, said system comprising additional links for connecting the first stage links in each switching frame with the last stage links in the other switching frames.

2. An automatic switching system according to claim 1, in which means are provided to preferentially select an outgoing line from a group of outgoing lines in a manner to minimize the number of connection stages when an incoming line is to be connected to the outgoing line of said group of outgoing lines.

3. An automatic switching system including a plurality of multistage switching frames each having a plurality of links arranged in more than two stages, said system comprising additional links for connecting the first stage links in each frame with the last stage links in the same frame having no connecting paths with said first stage links.

4. An automatic switching system including a plurality of multistage switching frames each having a plurality of links arranged in more than two stages, said system having said frames divided into a plurality of frame groups each having independent outgoing lines, and said system comprising additional links for providing connection between the links of the different frame groups in a manner that the first stage links in any one frame of one frame group are connected with the last stage links in any one frame of the other frame groups by said additional links.

5. An automatic switching system including a plurality of multistage switching frames each having a plurality of links arranged in more than two stages, said system having said frames arranged in a manner that each frame has its independent outgoing lines, and said system comprising additional links for providing connection between the different frames in a manner that the first stage links in any one frame are connected with the last stage links in any other frames by said additional links.

References Cited

UNITED STATES PATENTS

| | | | |
|---|---|---|---|
| 3,308,242 | 3/1967 | Erwin | 179—22 |
| 3,317,676 | 5/1967 | Ekbergh et al. | 179—22 |

WILLIAM C. COOPER, *Primary Examiner.*

KATHLEEN H. CLAFFY, *Examiner.*

L. A. WRIGHT, *Assistant Examiner.*